United States Patent
Prust et al.

(10) Patent No.: US 8,172,489 B2
(45) Date of Patent: May 8, 2012

(54) MACHINE TOOL, IN PARTICULAR FOR RIM MACHINING

(75) Inventors: Dirk Prust, Tuttlingen (DE); Hans-Henning Winkler, Tuttlingen (DE); Torsten Winkler, Wurmlingen (DE)

(73) Assignee: Chiron-Werke GmbH & Co. KG, Tuttlingen (DE)

( * ) Notice: Subject to any disclaimer, the term of this patent is extended or adjusted under 35 U.S.C. 154(b) by 70 days.

(21) Appl. No.: 12/873,081

(22) Filed: Aug. 31, 2010

(65) Prior Publication Data

US 2011/0068544 A1 Mar. 24, 2011

Related U.S. Application Data

(63) Continuation of application No. PCT/EP2009/001553, filed on Mar. 5, 2009.

(30) Foreign Application Priority Data

Mar. 7, 2008 (DE) .......................... 10 2008 014 835

(51) Int. Cl.
*B23B 35/00* (2006.01)
*B23B 41/00* (2006.01)

(52) U.S. Cl. ........... 408/132; 279/141; 408/1 R; 408/89; 408/106; 409/219; 409/903; 269/134; 269/155; 269/266; 269/268

(58) Field of Classification Search .................. 279/156, 279/141, 126, 139, 106–109; 408/1 R, 8, 408/89, 103–108, 234; 409/131–132, 219, 409/221, 224, 225, 903; 269/155, 134, 136, 269/138, 266, 268, 270; 157/16–18
See application file for complete search history.

(56) References Cited

U.S. PATENT DOCUMENTS 1,730,063 A * 10/1929 Dustan et al. ................. 269/156
(Continued)

FOREIGN PATENT DOCUMENTS

DE 102 56 870 6/2004
(Continued)

OTHER PUBLICATIONS

International Search Report for PCT/EP2009/001553, mailed on Aug. 17, 2009, 3 pages.

*Primary Examiner* — Daniel Howell
(74) *Attorney, Agent, or Firm* — Morrison & Foerster LLP (57) ABSTRACT

The present invention relates to a machine tool for machining of workpieces, having a workpiece support for mounting the workpiece, a tool holder, which can be moved at least along one axis, for holding a tool for machining the workpiece, and workpiece holding units for fixing the workpiece during the machining, the workpiece holding units being arranged outside the workpiece support surface of the workpiece support, which is covered by the workpiece in the mounted state, and each having a holding element for fixing the workpiece. In order that also workpieces of greater diameter can be machined, the machine tool otherwise being of the same dimensions, it is provided according to the invention that the holding elements can each be moved, substantially parallel to the workpiece support surface, in the direction of the workpiece, in particular in the direction of a central workpiece axis, which runs perpendicular to the workpiece support surface, for the purpose of centering and fixing the workpiece. The holding elements comprise a clamping surface that is arranged obliquely in relation to the workpiece support surface and that is, in the mounted state, pressed against the workpiece for fixing and centering the workpiece to be machined, thereby exerting a pressure both in the direction of the workpiece support surface and in the direction of the central workpiece axis.

13 Claims, 6 Drawing Sheets

U.S. PATENT DOCUMENTS

| | | | | |
|---|---|---|---|---|
| 1,815,562 A | * | 7/1931 | Godfriaux | 279/4.04 |
| 2,657,063 A | * | 10/1953 | Trosch et al. | 279/71 |
| 4,866,834 A | * | 9/1989 | Winkler et al. | 483/1 |
| 5,135,242 A | | 8/1992 | Toth | |
| 5,503,508 A | * | 4/1996 | Amiguet et al. | 408/1 R |
| 5,820,137 A | | 10/1998 | Patterson | |
| 6,015,247 A | * | 1/2000 | Branaman | 408/1 R |
| 6,241,258 B1 | | 6/2001 | Roussel | |
| 2006/0049616 A1 | | 3/2006 | Rogalla et al. | |

FOREIGN PATENT DOCUMENTS

| | | |
|---|---|---|
| EP | 0 288 786 | 11/1988 |
| EP | 0 290 896 | 11/1988 |
| EP | 0 995 527 | 4/2000 |
| WO | WO-2005/012867 | 2/2005 |
| WO | WO-2006/003683 | 1/2006 |

* cited by examiner

MACHINE TOOL, IN PARTICULAR FOR RIM MACHINING

CROSS-REFERENCE TO RELATED APPLICATIONS

This is a continuation application of International patent application PCT/EP2009/001553, filed on 5 Mar. 2009, designating the United States and published as WO 2009/109384 A1, which claims priority to German application No. 10 2008 014 835.0, filed on 7 Mar. 2008. The contents of these prior applications are incorporated herein by this reference in their entirety.

BACKGROUND OF THE INVENTION

1. Field of the Invention

The present invention relates to a machine tool for machining workpieces, comprising a workpiece support for mounting the workpiece, a tool holder, which is adapted to be moved at least along one axis, for holding a tool for machining the workpiece, and workpiece holding units for fixing and centering the workpiece during the machining.

The invention further relates to a corresponding method for machining workpieces, comprising the steps of: mounting the workpiece on a workpiece support, holding a tool by a tool holder, which is adapted to be moved at least along one axis, machining the workpiece with the tool, and fixing and centering the workpiece during machining by workpiece holding units.

Further, the present invention also relates to a workpiece holding unit for fixing and centering a workpiece during the machining by means of an above mentioned machine tool.

2. Related Prior Art

Machine tools of the type stated at the outset are used, for example, for machining of automobile wheel rims, in particular for applying drilled holes for subsequent valve lead-through and for the wheel bolts. For the purpose of fixing a rim during machining, in the case of a known machine tool the rim is placed on the workpiece support, e.g., the workpiece table or a cradle plate of a cradle, in such a way that, for the purpose of centering the rim, the hub hole is placed onto an arbor provided on the workpiece support and the lower rim flange rests on the workpiece support. Further, for the purpose of fixing the rim, a plurality of piston cylinder units, for example three, are provided on the workpiece support. These piston cylinder units are arranged in a distributed manner around the rim, and each carry a hold-down device as a holding element.

For the purpose of fixing the rim, in the case of this machine tool, the positions of the piston cylinder units must first be matched to the diameter of the rim to be machined, for which purpose the piston cylinder units have to be moved along a travel rail on the workpiece support and then anchored. Then, by means of a swiveling arm, the hold-down device is in each case swiveled to the rim and then folded down from above onto the lower rim flange, whereby the rim is pressed against the workpiece support from above.

Apart from the fact that, in the case of the known machine tool, the piston cylinder units having the hold-down devices that can be swiveled and folded down have a relatively complex mechanical system, there is also the disadvantage that these piston cylinder units are directly exposed to the stock cuttings produced during machining and to the coolant, and consequently rapidly accumulate dirt or even become worn. Further, the piston cylinder units occupy a lot of space in the working area, such that only rims up to a maximum diameter can be machined, since otherwise the robot arm usually employed for loading the rims into and out of the working area would collide with the piston cylinder units. Furthermore, the positions of the piston cylinder units have to be reset if changes are made to the diameter of the rims to be machined, and a plurality of motions, of differing axes, are required in order to fix the rim. Moreover, a centering arbor is essential for centering.

SUMMARY OF THE INVENTION

The present invention is therefore based on the object of specifying a machine tool, a method and a workpiece holding unit provided for same for machining of workpieces, which avoid the said disadvantages and which are suitable, in particular, for machining automobile wheel rims, i.e., in which the workpiece holding units are of a more simple mechanical structure, are less exposed to dirt accumulation and occupy less space in the working area.

This object is achieved by a machine tool for machining workpieces, said machine tool comprising a workpiece support for mounting the workpiece, a tool holder, which is adapted to be moved at least along one axis, for holding a tool for machining the workpiece, and workpiece holding units for fixing and centering the workpiece during the machining, wherein the workpiece holding units are arranged outside the workpiece support surface of the workpiece support, which is, in the mounted state, covered by the workpiece, wherein each workpiece holding unit comprises a holding element for fixing and centering the workpiece, wherein the holding elements are adapted to be moved, substantially parallel to the workpiece support surface, in the direction of the workpiece, in particular in the direction of a central workpiece axis, which runs perpendicular to the workpiece support surface, and wherein the holding elements comprise a clamping surface that is arranged obliquely in relation to the workpiece support surface and that is, in the mounted state, pressed against the workpiece for fixing and centering the workpiece to be machined, thereby exerting a pressure both in the direction of the workpiece support surface and in the direction of the central workpiece axis.

This object is further achieved by a method for machining workpieces, said method comprising the steps of mounting the workpiece on a workpiece support, holding a tool by a tool holder, which is adapted to be moved at least along one axis, machining the workpiece with the tool, and fixing and centering the workpiece during machining by workpiece holding units, wherein the workpiece holding units are arranged outside the workpiece support surface of the workpiece support, which is, in the mounted state, covered by the workpiece, wherein each workpiece holding unit comprises a holding element for fixing and centering the workpiece, wherein the workpiece is fixed and centered by moving the holding elements substantially parallel to the workpiece support surface, in the direction of the workpiece, in particular in the direction of a central workpiece axis, which runs perpendicular to the workpiece support surface, and wherein the holding elements comprise a clamping surface that is arranged obliquely in relation to the workpiece support surface and that is, in the mounted state, pressed against the workpiece for fixing and centering the workpiece to be machined, thereby exerting a pressure both in the direction of the workpiece support surface and in the direction of the central workpiece axis.

Finally, the object is also achieved through a workpiece holding unit for fixing and centering a workpiece during the machining of the workpiece by means of a machine tool of the kind mentioned above, said workpiece holding unit comprising a holding element for fixing and centering the workpiece, wherein the holding element is adapted to be moved, substantially parallel to a workpiece support surface on which the workpiece is mounted during the machining, in the direction of the workpiece, in particular in the direction of a central workpiece axis, which runs perpendicular to the workpiece support surface, and wherein the holding element comprises a clamping surface that is arranged obliquely in relation to the workpiece support surface and that is, in the mounted state, pressed against the workpiece for fixing and centering the workpiece to be machined, thereby exerting a pressure both in the direction of the workpiece support surface and in the direction of the central workpiece axis.

The invention in this case is based on the concept, no longer of merely fixing the workpiece from above and pressing it against the workpiece support, but of fixing the workpiece as close as possible to the workpiece support, thus, if possible, at the lower edge. Further, by means of appropriately designed holding elements, a pressure is applied against the workpiece, both in the direction of the central workpiece axis and in the direction of the workpiece support, and the workpiece is thereby both centered and fixed.

The holding elements in this case are matched to the design of the workpiece to be machined. In the case of automobile wheel rims, the lower rim flange, in particular, is suitable for centering and fixing, which wheel flange, upon placement of the rim directly onto the workpiece support, rests such that the workpiece holding units in this case can be so designed that the holding elements are located only a short distance above the workpiece support.

In contrast to the known machine tool, it is thus sufficient if the holding elements can each be moved in a single direction, namely, in the direction of the workpiece, preferably in a plane parallel to the workpiece support surface of the workpiece support. The workpiece holding elements can therefore be of a significantly more simple mechanical structure, since no swiveling and folding mechanisms are required, as in the case of the piston cylinder units used in the case of the known machine tool. A single travel motion of the holding units thus suffices to center and fix the workpiece. This mechanically very simple structure therefore provides for very exact positioning, for which reason further centering means are no longer absolutely necessary. The holding units can be so matched to one another in their position that the workpiece is clamped very exactly and centrally in the workpiece holding unit, without the need for more extensive setting or positioning resources. Further, it is also not necessary for the positions of the workpiece holding units on the workpiece support to be reset if the diameter of the workpieces is altered.

The workpiece holding units according to the invention also occupy significantly less space in the working area, which provides, inter alia, for the machining of workpieces of greater diameter (thus, for example, larger automobile wheel rims) in the same amount of working area, since there is more space available in the working area for workpiece loading and unloading by the workpiece loading and unloading robots that are usually employed.

Since, according to the invention, the workpiece holding units are of a significantly more simple mechanical structure and occupy less space in the working area, they are also exposed to significantly less dirt accumulation resulting from stock cuttings and coolant, or can be protected significantly more easily against such dirt accumulations. In a preferred design, it is provided, for example, that the workpiece holding units are integrated substantially into the workpiece support, do not project out of the workpiece support, or project only partially therefrom, and do not project beyond the top side of the workpiece that faces away from the workpiece support.

In a further design of the machine tool according to the invention, it is provided that the holding elements are designed to engage in a groove or to overlap a flange on the workpiece, the holding elements being designed and arranged in such a way that a contact pressure, in the direction of the workpiece support, is exerted upon the workpiece in the mounted state by the holding elements. Fixing and centering of the workpiece are thereby achieved in a particularly simple manner. As already mentioned above, the holding elements are, of course, matched to the groove or the flange arranged on the workpiece. To enable differing workpieces, for example differing rims, to be machined by means of the same machine tool, it is further provided, preferably, that the holding elements are exchangeable, such that the appropriate holding elements can also be used, according to the workpiece.

In a further design, it is further provided according to the invention that engagement means, for engaging in corresponding receivers in the underside of the workpiece that faces towards the workpiece support, are provided on the workpiece support, in the region of the workpiece support surface, in particular in the central region of the workpiece support surface. These engagement means can have, for example, a centering arbor, which engages in a centric drilled centerhole of the workpiece (in the case of a rim, for example, the hub hole). The arbor can be, for example, a conical arbor that is oversized relative to the drilled hole diameter of the centerhole, whereby, at the same time, centering of the workpiece is also achieved. The conical diameter of the arbor further offers the advantage that the latter can be used for differing sizes of centerholes, or hub holes. By means of the arbor, owing to the fact that it is slightly oversized relative to the drilled hole diameter, very exact positioning of the workpiece within the workpiece holding unit is automatically achieved, immediately upon placement of the workpiece on the arbor.

Further, it is provided, preferably, that the workpiece holding units have drive means, in particular hydraulic, pneumatic or electromotive drive means, for moving the holding elements independently of one another. In principle, the holding elements of the differing workpiece holding units can be moved independently of one another. It can also be provided, however, particularly in the case of workpieces of rotationally symmetrical design such as, for instance, rims, that the drive means of the individual workpiece holding units are moved synchronously in relation to one another, thus press simultaneously against the workpiece from outside from differing directions, and thereby additionally contribute to centering. This can be effected mechanically or electronically, through synchronized driving of all holding elements. Especially in the already described case of rotationally symmetrical workpieces, this synchronization enables the workpiece to be mounted exactly centrally by means of the holding elements according to the invention. Thus, there is no adjustment resource requirement for exact positioning of the workpiece. In addition, matching to differing workpiece diameters can be realized in a rapid and simple manner.

Further, for the purpose of protecting against the above-mentioned dirt accumulations, it is preferably provided that the workpiece holding units have covers, for example a full-perimeter protective band or a cap, which protect the drive means against dirt accumulation. Such protection can be achieved through simple means, particularly if the workpiece holding units are fully or mostly integrated into the workpiece support.

In principle, the tool holder can be arranged in any manner. Preferably, in particular for the machining of rims, the tool holder is arranged in the workpiece support, or beneath the workpiece support, for the purpose of machining the workpiece from the direction of the workpiece support. In the case of rims, for example, the drilled holes for the valve lead-through and for lead-through of the hub bolts are applied in the rim from below. In this case, for example, the tool can only be moved along an axis that runs vertically, while the workpiece can be arranged on a cradle that can be swiveled about a transverse axis that runs horizontally, in order that drilled holes running obliquely through the rim, for example through a rim spoke, can also be applied thereby, as is usually required for valve lead-through.

In an advantageous design, it is provided that the workpiece holding units have pressure measuring means, for measuring whether a pressure exerted in the direction of a central workpiece axis exceeds a reference pressure, and for stopping the holding element of the respective workpiece holding unit from being moved in the direction of the workpiece if the measured pressure exceeds the reference pressure. This contributes to optimal centering and optimal fixing of the workpiece, without damaging the workpiece or the workpiece holding unit.

Finally, in a design it is provided that the holding elements have a clamping surface that runs obliquely in relation to the workpiece support surface and that is pressed against the lower rim flange for the purpose of fixing and centering the rim to be machined, and thereby exerts a pressure both in the direction of the workpiece support surface and in the direction of the central rim axis. This not only enables the workpiece to be fixedly seated in the workpiece holding unit, but also prevents tilting and, at the same time, contributes positively to the exact centering of the workpiece.

It is understood that the claimed method and the claimed workpiece holding unit can be developed in the same or a similar manner to that described above in respect of the machine tool and defined in the dependent claims. Further, the features described above and explained in the following can be realized according to the invention, not only in the combinations described, but in any discretionary combination.

BRIEF DESCRIPTION OF THE DRAWINGS

The invention is explained more fully in the following with reference to the drawings, wherein.

DETAILED DESCRIPTION OF THE INVENTION

Figure 1:
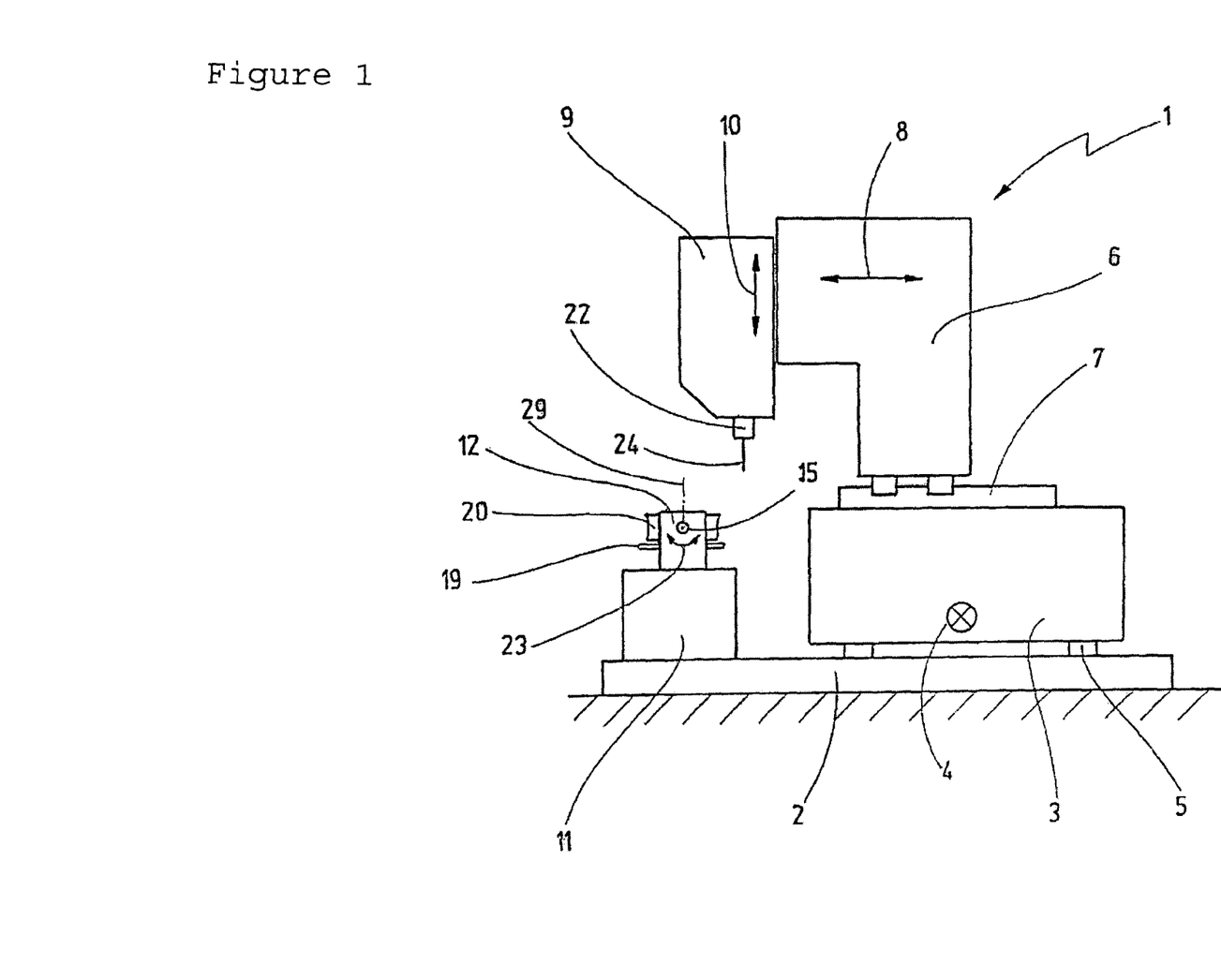
FIG. 1 shows a schematic side view of a basic diagram of a machine tool according to the invention.

A machine tool, shown in a schematic representation that is not true to scale or accurate in detail, is denoted by 1 in FIG. 1.

On its machine base 2, the machine tool 1 has a first carriage 3, which is movable on guide rails 5 in the direction of a first axis 4. A second carriage 6 is arranged on the first carriage 3 so as to be movable, via guide rails 7, in the direction of a second axis 8.

A spindle head 9 is mounted on the second carriage 6 so as to be movable in the direction of a third axis 10. Rotatably mounted in the spindle head 9 is a working spindle 22, which carries a tool 24 at its lower end.

Further provided on the machine base 2 is a workpiece table 11, on which, in the present case, there is arranged a cradle device 12, which carries a workpiece 20, indicated schematically. The cradle device 12 can be swiveled, in the arrow direction 23, about a transverse axis 15 that, in the present case, runs parallel to the first axis 4. Further, preferably, the workpiece is rotatable about a fourth, workpiece axis 29, which, in the present case, runs parallel to the third axis.

Through moving the spindle head 9, and thereby the working spindle 22, in the three axes 4, 8, 10, and through swiveling the cradle device about the transverse axis 15 and/or rotating the workpiece about the workpiece axis 29, differing points on the workpiece 20 can be machined by means of the tool 23.

Further general details and the basic functioning of such a machine tool are general knowledge to persons skilled in the art, and therefore are not to be described further at this point.

Figure 2:
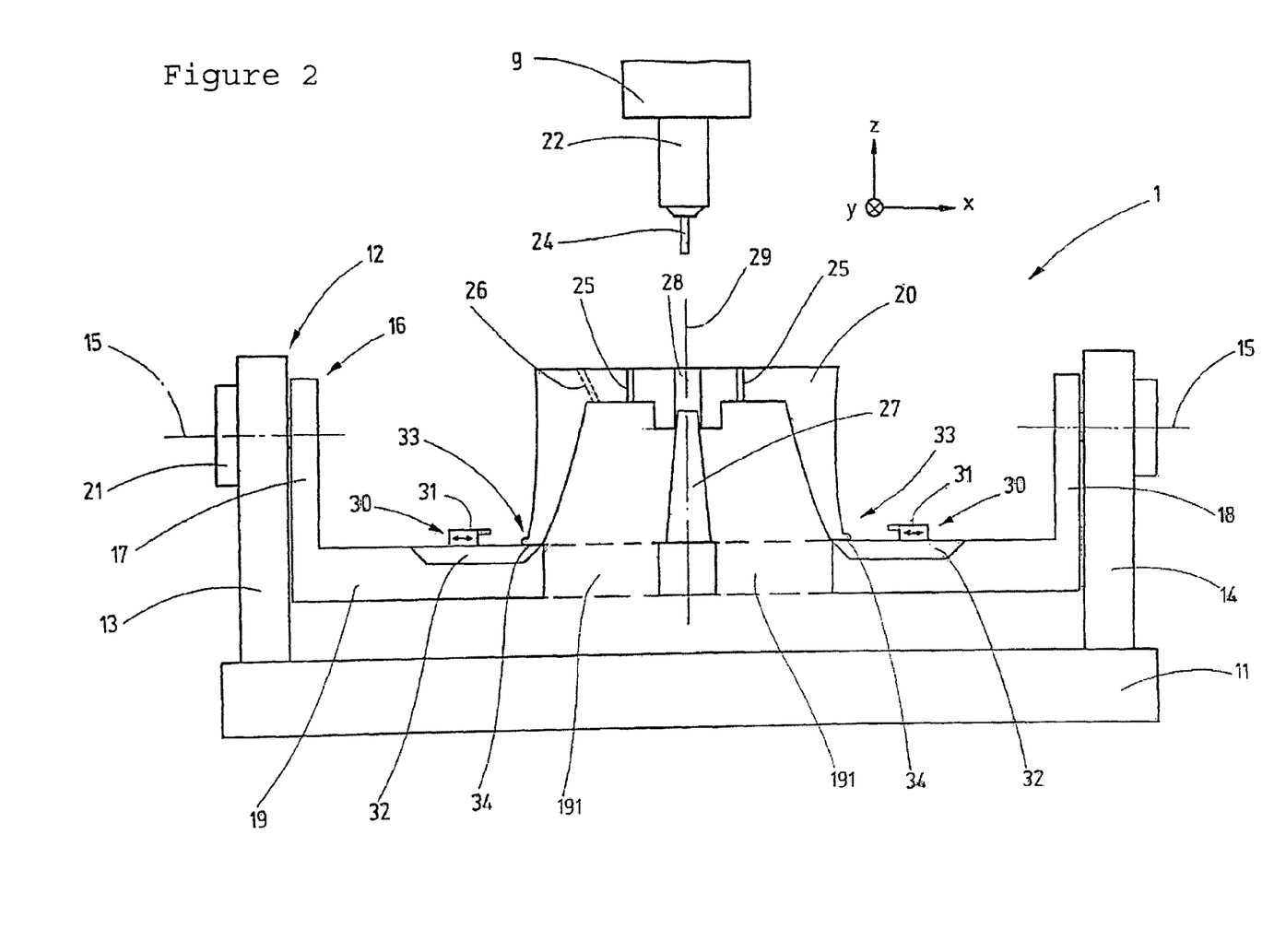
FIG. 2 shows a front view of a machine tool according to the invention.

FIG. 2 shows a more detailed front view of a machine tool 1 according to the invention, the means, shown in FIG. 1, for moving the tool 24, i.e., in particular the carriages and guide rails, not being shown here, and only the tool 24 itself, with the working spindle 22 and the spindle head 9, being represented. The carriage device 12 arranged on the workpiece table 11 comprises, in a manner known per se, two uprights 13, 14, which are spaced apart from one another and between which a U-shaped holder 16 is mounted so as to be swivelable about a swivel axis 15. The U-shaped holder 16 comprises two limbs 17, 18, via which support on the uprights 13, 14 is effected and between which there extends a cradle plate 19 (which, in the present case, constitutes the workpiece support), on which the workpiece 20 is mounted for machining. Also shown on the upright 13 is a drive 21, by means of which the U-shaped holder 16 can be swiveled, about the swivel axis 15, out of the horizontal position shown in FIG. 2, in principle by 360°.

Shown as a workpiece 20 in the present case, by way of example, is an automobile wheel rim 20, in which drilled holes 25, for the subsequent lead-through of the wheel bolts, or a drilled valve hole 26 can be applied by means of a drilling tool 24. For this purpose, in the case of this design of the machine tool 1, the automobile wheel rim 20 is swiveled about the transverse axis 15, such that the drilling tool 24 then applies the required drilled holes 25, 26 in the automobile wheel rim 20 from, as it were, the inside. For the purpose of applying the drilled holes 25 for lead-through of the bolts, the automobile wheel rim is preferably swiveled by 180° relative thereto. In order for the drilled valve hole 26 to be applied in the automobile wheel rim 20, which drilled hole generally runs obliquely in the rim, it is swiveled, by contrast, by less (or more) than 180°, such that the drilling tool 24 also effects the application of this valve bore 26 merely through an advance along the third axis 10 (running in the z direction).

As evident from FIG. 2, the cradle plate 19 has a recess 191 in the central region beneath the workpiece 20, in order to make the workpiece 20 accessible from the inside for machining by means of the tool 24.

To enable the workpiece 20 to be mounted centrically on the U-shaped holder 16, in the present case there is provided, on the cradle plate 19, a centering arbor 27 whose outer diameter is matched to the inner diameter of a centric drilled hole 28 in the workpiece 20, in the present case of the hub hole 28 of the rim 20, such that the workpiece 20 can be placed with the centric drilled hole 28 on the arbor 27, for example a conical arbor, for example by means of a robot arm. The outer diameter of the arbor 27 is so designed, in particular, that the workpiece 20, when it has been placed on the arbor 27, rests precisely on the cradle plate 19, such that the workpiece 20 is supported both on the arbor 27 and on the cradle plate 19. It must be mentioned, however, that such support on the cradle plate 19 is not absolutely necessary in the case of use of an arbor 27. Further, the use of an arbor 27 is also not essential, since the means for fixing the workpiece 20 that are described in the following likewise effect centering of the workpiece 20.

For the purpose of fixing the workpiece 20 during the machining operation, at least two workpiece holding units 30, preferably integrated into the carriage plate 19, are provided according to the invention. These workpiece holding units each have a holding element 31 that can be moved, relative to the holding body 32 of the workpiece holding unit 30, in the direction of the workpiece 20, preferably in a direction that runs parallel to the x-y plane and perpendicular to the central workpiece axis 29, which, in the present case, runs in the z direction.

The holding elements 31 are so designed, in particular, that they fix the workpiece 20 in a centered position during the machining operation. This is achieved in that the holding elements 31 are matched to the conditions of the workpiece 20, for example to a corresponding groove in which the holding elements 31 can engage, or to a corresponding flange that can be overlapped by the holding elements 31. The holding elements 31 in this case are preferably so designed that they exert a pressure against the workpiece 20, both in the direction of the central workpiece axis 29, here in the x direction, and in the direction of the cradle plate 19, here in the z direction, in order both to center and to securely fix the workpiece 20.

Preferably, the arbor 27 is so designed that the workpiece 20, when it has been placed thereon but has not yet been fixed by the holding elements 31, does not yet rest with its lower edge 33 on the workpiece support surface 34 of the cradle plate 19, but that, instead, there is a slight air gap between them at that location. It is only when the holding elements 31 act on the lower edge 33, which, in the case of the workpiece 20 shown here, projects slightly outwards in the form of a flange and constitutes the lower rim flange, and thereby press the workpiece 20 as a whole in the direction of the workpiece support surface 34, that the lower edge 33 rests on the workpiece support surface 34 and is thereby fixedly mounted on the cradle plate 19 for the purpose of machining.

It must be mentioned at this point that the term "workpiece support", on which the workpiece is mounted for the purpose of machining, is intended to mean both the workpiece table 11 and the cradle plate 19, depending on the design of the machine tool. In the case of a number of designs, a cradle device 12, shown in FIGS. 1 and 2, is provided, in which case the workpiece 20 is then mounted on the cradle plate 19. In the case of other machine tools, on the other hand, particularly if there is no need to swivel the workpiece about the transverse axis 15 for the purpose of machining, there is no such cradle device 12, thus also no cradle plate 19, such that the workpiece 20 is then mounted directly on the workpiece table 11, into which, preferably, the workpiece holding units 30 are integrated in that case.

Figure 3:
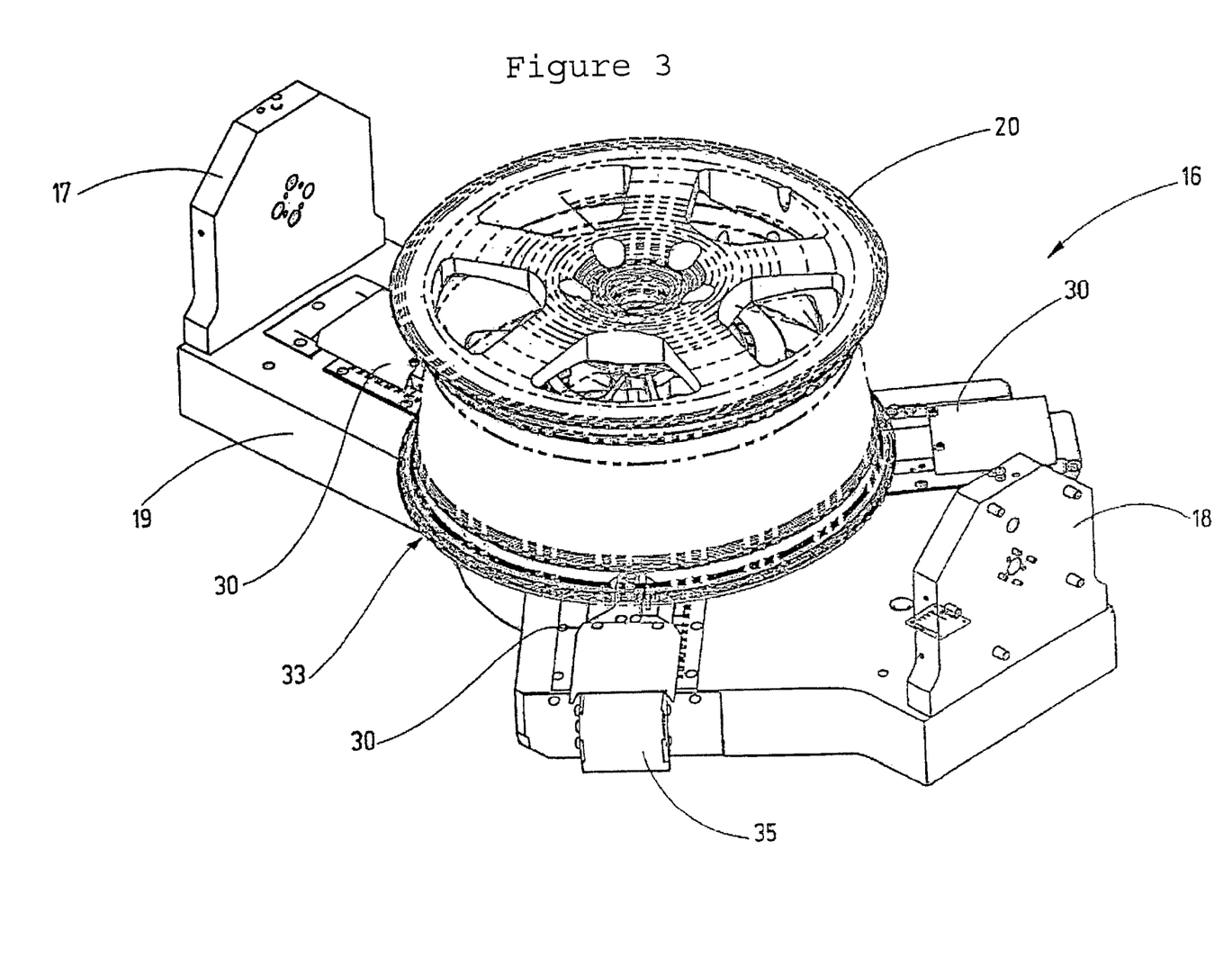
FIG. 3 shows an oblique view of a holding device of a machine tool according to the invention for rim machining.
Figure 4:
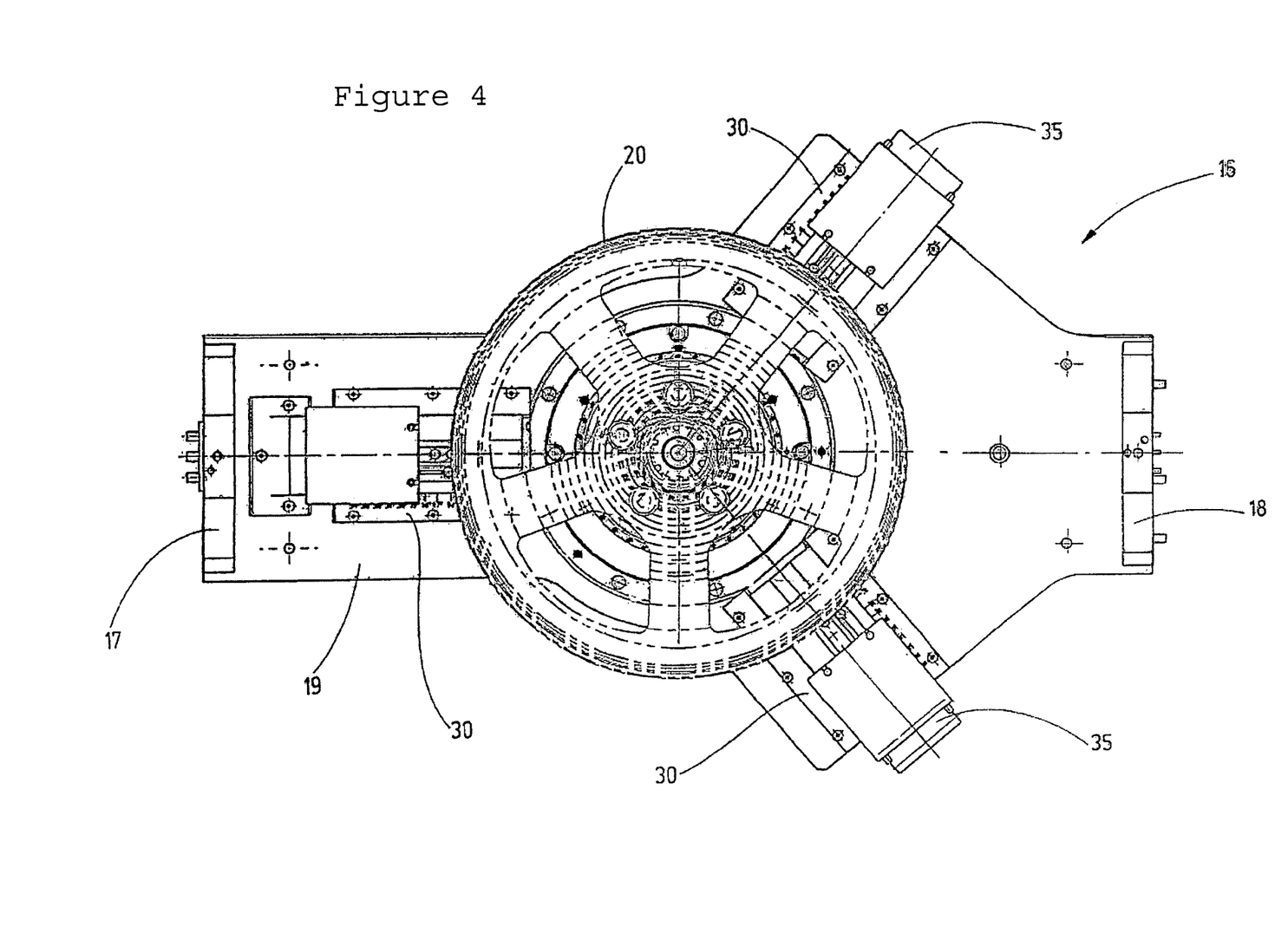
FIG. 4 shows a top view of the holding device shown in FIG. 3.
Figure 5:
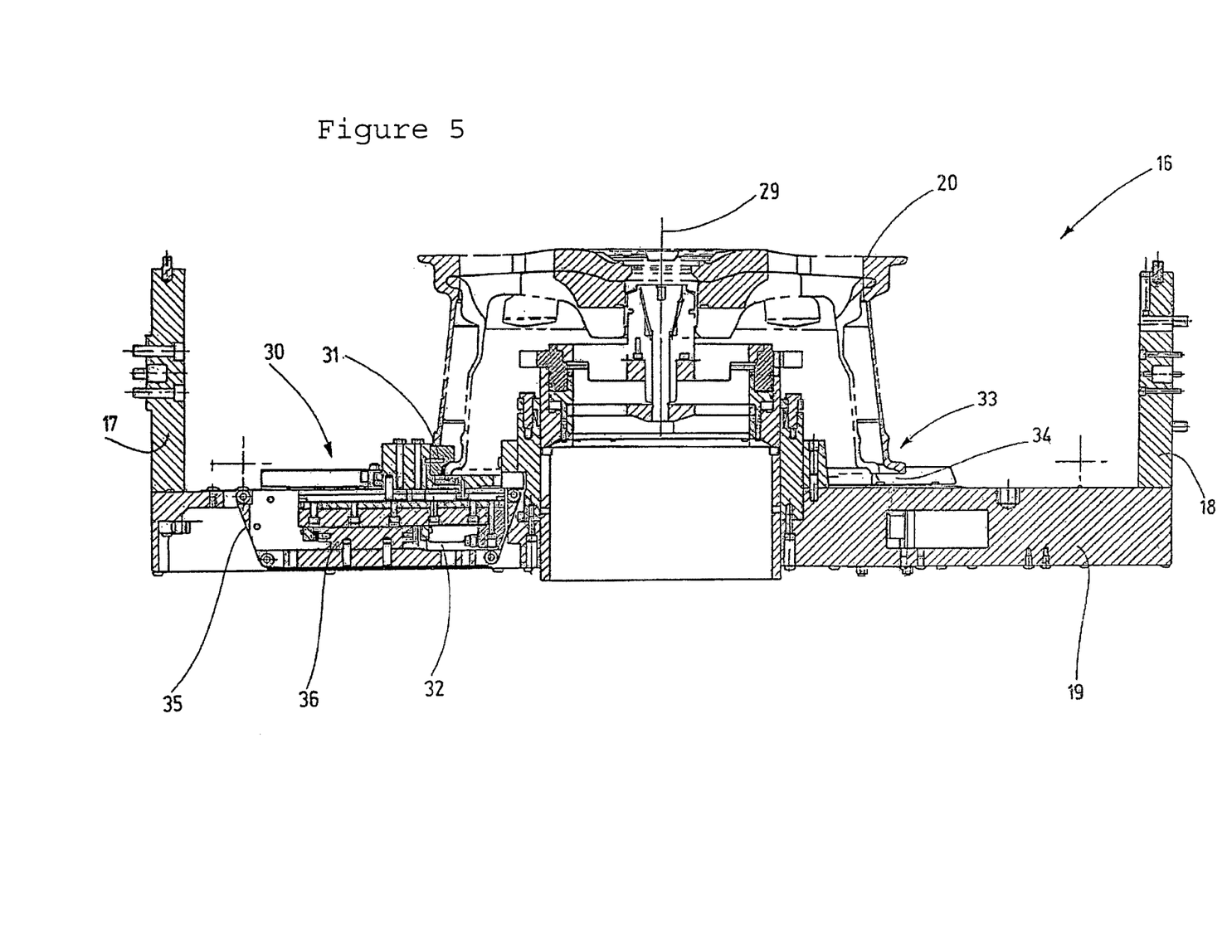
FIG. 5 shows a side view of the holding device shown in FIG. 3.

More detailed representations of the U-shaped holder 16 of a machine tool according to the invention intended for rim machining are shown, with a mounted rim 20 in each case, in FIGS. 3 to 5. FIG. 3 shows an oblique view of the U-shaped holder 16, FIG. 4 shows a top view of the U-shaped holder 16, and FIG. 5 shows a lateral sectional view of the U-shaped holder 16. As evident from FIGS. 3 and 4, in the case of this design a total of three workpiece holding units 30 are provided, arranged around the rim 20, preferably each offset by 120° relative to one another. These workpiece holding units 30 are so arranged that the holding elements 31 can each be moved in a direction towards the rim 20, i.e., in a direction that runs parallel to the workpiece-side surface of the cradle plate 19 (i.e., parallel to the x-y plane) and perpendicular to the central workpiece axis 29, such that the holding element in each case meets the lower edge 32 of the rim 20 as perpendicularly as possible. It is further evident from FIG. 5, in particular, how the holding element 31 overlaps the lower rim flange 33 of the rim 20 in the clamped state and thereby presses the rim 20 as a whole downwards, in the direction of the workpiece support surface 34 of the cradle plate 19.

As is further evident from FIGS. 2 to 5, the workpiece holding units 30 occupy scarcely any space in the working area, since they are mostly integrated into the cradle plate 19. Consequently, in the case of a cradle device 16 otherwise of the same size, it is possible to machine rims of a larger diameter than is possible by means of the known machine tool, in which the workpiece holding units occupy significantly more space in the working area, since they are arranged laterally next to the rim 20 and project beyond the latter, in order to press the rim 20 against the cradle plate 19 by means of swivelable and tiltable hold-down devices. In the case of the machine tool according to the invention, there is also significantly more space available for loading and unloading of the rims by a robot arm.

Since, according to the invention, the workpiece holding units 30 are integrated into the cradle plate 19, they are also exposed to a significantly lesser degree of dirt accumulation resulting from coolant and stock cuttings. The workpiece holding units 30 can also be significantly better protected against such dirt accumulation. For example, cover plates can be provided on the top side, which cover plates extensively protect the greater part of the workpiece holding unit, in particular the drive means located on the inside, against such dirt accumulations. In the case of the design shown in FIGS. 3 to 5, a full-perimeter cover band 35 is provided for this purpose in each case, which cover band extends around the holding body 32 and almost completely covers the drive means 36, located inside the holding body 32, for moving the holding elements 31, and thereby protects them against dirt accumulations.

Figure 6:
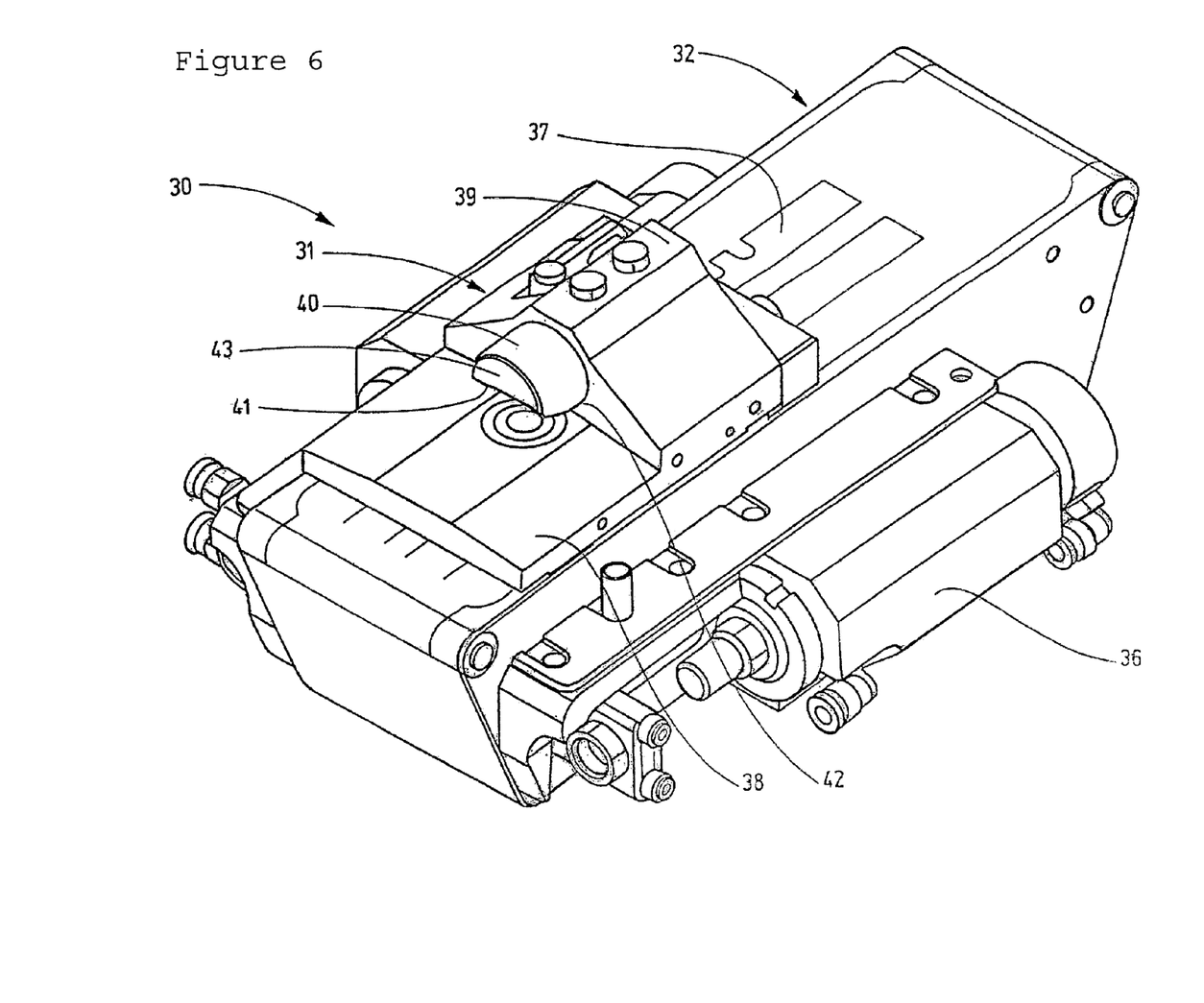
FIG. 6 shows a detail view of a workpiece holding unit according to the invention.

FIG. 6 shows a design of a workpiece holding unit 30 used in the case of the machine tool according to the invention. This shows the drive means arranged laterally on the holding body 32, in the present case being two compressed-air cylinders, by means of which the holding element 31 can be moved along a travel rail 37 located inside the holding body 32. It is understood that, clearly, other drive means can also be used, for example electric motors or hydraulic cylinders and that, in principle, only one drive means per workpiece holding unit 30 is also sufficient. The cover band 35 shown in FIGS. 2 to 4 is not shown in FIG. 6.

The holding element 31 comprises a travel plate 38, which is arranged so as to be movable on the travel rail 37 and which, on its top side, has a carrying part 39, at one end of which, being the end facing towards the workpiece, a clamping part 40 is attached. When the workpiece 20 has been fixedly clamped, this clamping part 40 is in contact with the latter and exerts the pressure upon the contacted surface of the workpiece 20 for the purpose of centered, fixed clamping of the workpiece 20. The clamping part 40 is therefore matched to the contacted surface of the workpiece 20, in order to apply this pressure optimally, without damaging the workpiece. For example, the clamping part 40 is made from plastic material, for example a hard rubber, and is preferably exchangeably attached to the carrying part 39, so that it can be exchanged in the case of wear or exchanged for another clamping part if the workpiece machined by the machine tool changes and is also differently designed.

In the case of the design shown, an oblique clamping surface 41 is provided on the underside of the clamping part 40, which clamping surface begins beneath an upper stop surface 43 and opens, towards the carrying part 39, into a lower stop surface 42. When the rim 20 has been mounted and fixedly clamped, the clamping surface 41, and preferably also the upper and lower stop surfaces 42, 43, are in contact with the lower rim flange 33 of the rim 20, the clamping surface 41, in particular, applying a pressure upon the lower rim flange from above, and the upper stop surface 43, arranged at the upper front edge of the clamping part 40, and/or the lower stop surface 42 applying a pressure substantially in the direction of the central workpiece axis 29.

The rim 20 is thereby securely wedged, is fixed in place during the machining operation and can therefore be swiveled about the transverse axis 15.

Preferably, there is further provided in the workpiece holding unit 30 a pressure measuring means, for example a back-pressure signaling device (not shown), which serves to measure the pressure exerted in the direction of the workpiece, particularly in respect of whether this measured pressure exceeds a reference pressure. If this is ascertained, the holding element 31 is not moved further in the direction of the workpiece, in order to prevent damage to the workpiece or to the workpiece holding unit.

Preferably, the workpiece holding units are controlled through a central control unit. In particular, the holding elements 31 are moved simultaneously and synchronously, such that pressure is applied synchronously to the workpiece from differing directions. It can also be provided, however, that the holding elements 31 are activated separately and individually and are moved individually, which can be advantageous, particularly in the case of non-symmetrically designed workpieces.

The invention is not limited to the designs shown. Various modifications are conceivable, particularly in respect of the number, arrangement and design of the workpiece holding units. Various modifications result, in particular, from the design of the workpieces to be machined. Moreover, the machining of the workpieces need not necessarily be effected from above and/or by means of a so-termed traveling-column machine as shown schematically in FIG. 1. In principle, the machining could also equally be effected from below and/or from the side, to the extent allowed or rendered necessary by the workpiece and/or the other conditions of the machine tool. For example, the tool spindle could act upon the workpiece from a lateral direction, and the workpiece in this case can be machined on its sides, or swiveled by 90° for the purpose of machining the underside or top side.

In principle, the tool holder can also be arranged beneath the workpiece 20, thus, for example, on the machine base 2, on the workpiece table 11 or integrated into the workpiece table 11, in order to machine the workpiece 20 from below.

Moreover, further axes can be provided, in addition to or as an alternative to the axes shown in the exemplary embodiments. Depending on the workpiece and the machining required, it can be advantageous to mount the workpiece so as to be rotatable about an axis running in the z direction, for example on a workpiece turntable. The cradle device can also be omitted entirely, and the workpiece then mounted directly on the workpiece table. Further, it can also be provided, in principle, that the workpiece is arranged so as to be movable in the x, y and/or z direction, while the tool is stationary during the machining operation, or is arranged so as to be movable only along individual axes.

The machine tool according to the invention is suitable, in particular, for machining rims that are automatically loaded into and unloaded from the machine tool. However, other workpieces can also be machined equally well by means of such a machine tool, particularly if the individual workpieces vary in their diameter, without the necessity of enlarging or modifying the entire machine tool and, in particular, the cradle device. Thus, for example, the machine tool according to the invention can be used for automobile wheel rims having a diameter of up to 30", while the known machine tool, of equal dimensions, can machine automobile wheel rims only up to a diameter of 24".

What is claimed is:

1. A machine tool for machining workpieces, said machine tool comprising:
    a workpiece support for mounting the workpiece,
    a tool holder, which is adapted to be moved at least along one axis, for holding a tool for machining the workpiece, and
    workpiece holding units for fixing and centering the workpiece during the machining,
    wherein the workpiece holding units are arranged outside the workpiece support surface of the workpiece support, which is, in the mounted state, covered by the workpiece,
    wherein each workpiece holding unit comprises a holding element for fixing and centering the workpiece,
    wherein the holding elements are adapted to be moved, substantially parallel to the workpiece support surface, in the direction of the workpiece, in particular in the direction of a central workpiece axis, which runs perpendicular to the workpiece support surface, and
    wherein the holding elements comprise a clamping surface that is arranged obliquely in relation to the workpiece support surface and that is, in the mounted state, pressed against the workpiece for fixing and centering the workpiece to be machined, thereby exerting a pressure both in the direction of the workpiece support surface and in the direction of the central workpiece axis.

2. The machine tool as claimed in claim 1, wherein the workpiece holding units are integrated substantially in the workpiece support, do not project out of the workpiece support, or project only partially therefrom, and do not project beyond the top side of the workpiece that faces away from the workpiece support.

3. The machine tool as claimed in claim 1, wherein the holding elements are designed to engage in a groove or to overlap a flange on the workpiece, the holding elements being designed and arranged in such a way that a contact pressure, in the direction of the workpiece support, is exerted upon the workpiece in the mounted state by the holding elements.

4. The machine tool as claimed in claim 1, wherein engagement means, for engaging in corresponding receivers in the underside of the workpiece that faces towards the workpiece support, are provided on the workpiece support, in the region of the workpiece support surface, in particular in the central region of the workpiece support surface.

5. The machine tool as claimed in claim 1, wherein the workpiece holding units have drive means, in particular hydraulic, pneumatic or electromotive drive means, for moving the holding elements.

6. The machine tool as claimed in claim 5, wherein the workpiece holding units have covers, which protect the drive means against dirt accumulation.

7. The machine tool as claimed in claim 1, wherein the tool holder is arranged in the workpiece support, or beneath the workpiece support, for the purpose of machining the workpiece from the direction of the workpiece support.

8. The machine tool as claimed in claim 1, wherein the workpiece holding units have pressure measuring means, for measuring whether a pressure exerted in the direction of a central workpiece axis exceeds a reference pressure, and for stopping the holding element of the respective workpiece holding unit from being moved in the direction of the workpiece if the measured pressure exceeds the reference pressure.

9. The machine tool as claimed in claim 1, wherein the machine tool is designed for rim machining, in particular for applying drilled holes and/or recesses in rims.

10. The machine tool as claimed in claim 9, wherein the holding elements are designed to overlap the lower rim flange of a flange to be machined.

11. The machine tool as claimed in claim 10, wherein the holding elements have a clamping surface that runs obliquely in relation to the workpiece support surface and that is pressed against the lower rim flange for the purpose of fixing and centering the rim to be machined, and thereby exerts a pressure both in the direction of the workpiece support surface and in the direction of the central rim axis.

12. A method for machining workpieces, said method comprising the steps of:
   mounting the workpiece on a workpiece support,
   holding a tool by a tool holder, which is adapted to be moved at least along one axis,
   machining the workpiece with the tool, and
   fixing and centering the workpiece during machining by workpiece holding units,
   wherein the workpiece holding units are arranged outside the workpiece support surface of the workpiece support, which is, in the mounted state, covered by the workpiece,
   wherein each workpiece holding unit comprises a holding element for fixing and centering the workpiece,
   wherein the workpiece is fixed and centered by moving the holding elements substantially parallel to the workpiece support surface, in the direction of the workpiece, in particular in the direction of a central workpiece axis, which runs perpendicular to the workpiece support surface, and
   wherein the holding elements comprise a clamping surface that is arranged obliquely in relation to the workpiece support surface and that is, in the mounted state, pressed against the workpiece for fixing and centering the workpiece to be machined, thereby exerting a pressure both in the direction of the workpiece support surface and in the direction of the central workpiece axis.

13. A workpiece holding unit for fixing and centering a workpiece during the machining of the workpiece by means of a machine tool as claimed in claim 1, said workpiece holding unit comprising:
   a holding element for fixing and centering the workpiece,
   wherein the holding element is adapted to be moved, substantially parallel to a workpiece support surface on which the workpiece is mounted during the machining, in the direction of the workpiece, in particular in the direction of a central workpiece axis, which runs perpendicular to the workpiece support surface, and
   wherein the holding element comprises a clamping surface that is arranged obliquely in relation to the workpiece support surface and that is, in the mounted state, pressed against the workpiece for fixing and centering the workpiece to be machined, thereby exerting a pressure both in the direction of the workpiece support surface and in the direction of the central workpiece axis.

\* \* \* \* \*